United States Patent
Murad et al.

(10) Patent No.: US 9,329,265 B2
(45) Date of Patent: May 3, 2016

(54) MULTIPLE TRANSMISSION METHODS FOR IMPROVING THE OPERATION OF AUTOMOTIVE RADAR SYSTEMS

(71) Applicant: GM GLOBAL TECHNOLOGY OPERATIONS LLC, Detroit, MI (US)

(72) Inventors: Mohannad Murad, Troy, MI (US); Joseph S. Colburn, Malibu, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 13/928,853

(22) Filed: Jun. 27, 2013

(65) Prior Publication Data

US 2015/0002329 A1    Jan. 1, 2015

(51) Int. Cl.

| | |
|---|---|
| G01S 7/28 | (2006.01) |
| G01S 7/292 | (2006.01) |
| G01S 13/44 | (2006.01) |
| G01S 13/93 | (2006.01) |
| G01S 7/35 | (2006.01) |
| G01S 13/42 | (2006.01) |
| G01S 7/40 | (2006.01) |
| G01S 7/03 | (2006.01) |
| G01S 7/41 | (2006.01) |
| G01S 13/02 | (2006.01) |

(52) U.S. Cl.
CPC ............ *G01S 13/931* (2013.01); *G01S 7/2813* (2013.01); *G01S 7/2925* (2013.01); *G01S 7/354* (2013.01); *G01S 7/4004* (2013.01); *G01S 13/42* (2013.01); *G01S 7/032* (2013.01); *G01S 7/292* (2013.01); *G01S 7/414* (2013.01); *G01S 13/44* (2013.01); *G01S 13/4409* (2013.01); *G01S 13/4445* (2013.01); *G01S 2007/4039* (2013.01); *G01S 2007/4091* (2013.01); *G01S 2013/0245* (2013.01); *G01S 2013/9375* (2013.01)

(58) Field of Classification Search
CPC ...... G01S 7/292–7/2928; G01S 13/44–13/449
USPC .................. 342/147, 155, 159–164
See application file for complete search history.

(56) References Cited

U.S. PATENT DOCUMENTS

| | | | | |
|---|---|---|---|---|
| 2,825,900 | A | * | 3/1958 | Collbohm ...................... 342/380 |
| 3,500,414 | A | * | 3/1970 | Woerrlein ...................... 342/380 |
| 3,723,952 | A | * | 3/1973 | Walsh ........................... 367/100 |

(Continued)

OTHER PUBLICATIONS

Iterrogation Path Side Lobe Suppression (ISLS) [online]. Radar Basics [retrieved on May 12, 2013]. Retrieved from Internet: <URL: http://www.radartutorial.eu/13.ssr/sr10.en.html>.

*Primary Examiner* — Peter Bythrow
(74) *Attorney, Agent, or Firm* — Ingrassia Fisher & Lorenz, P.C.

(57) ABSTRACT

Methods for disambiguating the location of a radar contact using an N×M dimensioned radar array are provided. In the horizontal plane, the method comprises transmitting a first radar energy pattern in a direction, collecting reflected energy of the first radar energy pattern from the contact, transmitting a second radar energy pattern in the direction and collecting reflected energy of the second radar energy pattern from the contact. The method further comprises comparing the collected energy of the first radar energy pattern and the collected energy of the second radar energy pattern and determining if the contact is located in a side lobe or a main lobe of the first and second radar energy pattern based on the comparison. In the vertical plane, other similar embodiments may be used to determine if the radar antenna(s) are blocked by an obstacle.

19 Claims, 7 Drawing Sheets

(56) References Cited

U.S. PATENT DOCUMENTS

| | | | |
|---|---|---|---|
| 3,747,100 A * | 7/1973 | Gulick, Jr. | 342/380 |
| 4,143,372 A * | 3/1979 | Salvaudon et al. | 342/94 |
| 5,243,352 A * | 9/1993 | Sezai | 342/382 |
| 5,291,209 A * | 3/1994 | Evans et al. | 342/381 |
| 5,537,367 A * | 7/1996 | Lockwood et al. | 367/87 |
| 5,652,591 A * | 7/1997 | Liu et al. | 342/380 |
| 6,127,974 A * | 10/2000 | Kesler | 342/417 |
| 6,377,212 B1 * | 4/2002 | Kinghorn et al. | 342/380 |
| 7,728,764 B2 * | 6/2010 | Lok et al. | 342/159 |
| 2011/0063158 A1 * | 3/2011 | Kondou | 342/27 |

\* cited by examiner

MULTIPLE TRANSMISSION METHODS FOR IMPROVING THE OPERATION OF AUTOMOTIVE RADAR SYSTEMS

TECHNICAL FIELD

The technical field generally relates to automotive radar systems, and more particularly relates to methods for enhancing the functionality of such systems to disambiguate the location of a close-in radar contact.

BACKGROUND

The sophistication and capability of automobiles is expanding exponentially as automobile manufactures race to differentiate themselves in the market place by adding features and technological capabilities to their products. As the cost, size and power consumption of certain technological components drops, these components become feasible additions to automotive systems. This is particularly so of sensors that allow new functionality to be included.

One such sensor that is gaining popularity is the use of radar in automobiles. Although radar has been in existence since before World War II, the size and power consumption of it various components and the rotating nature of the send/receive antenna made such use in automobiles stuff for science fiction novels. However, with the adoption of the SPY-1 phased array radar system by the U.S. Navy 25 years ago, fully solid state, non-rotating antenna radar systems for automotive use became possible.

Unlike a classic rotating radar antenna, a phased array radar antenna is a composite antenna composed of multiple transceiver elements, each of which is controlled by a phase shifter. Radar beams are formed and directed by shifting the phase of a signal emitted from each element so as to create a constructive and destructive interference pattern that can be "steered" in the direction of the increasing phase shift among the elements, without having to physically redirect any element of the composite antenna. The constructive pattern steers the beam while the destructive pattern improves the sharpness/resolution of the beam. Some exemplary phased array systems that are suitable for automotive uses include 25 GHZ multi-mode radar systems sold by Autoliv, Inc. of Stockholm Sweden and 76 GHz radar systems from both Delphi Automotive PLC of Troy Mich. and the Bosch Group of Stuttgart Germany.

As simple examples, phased array radars may have linear arrays of radiating/receiving elements or planar arrays of radiating elements. Linear array radars feature rows of radiating/receiving elements in an X-Y matrix, where each row is controlled by a common phase shifter. Linear arrays may only steer the composite radar beam in one direction. Planar arrays feature radiating elements in an X-Y matrix where each radiating/receiving element has its own phase shifter and thus can be coordinated by computer to "steer" the composite radar beam in two dimensions. Phase shifters may operate to both "steer" a beam being transmitted by the antenna array and to "steer" the sensitivity of the antenna array to look in a particular direction for a return signal being received.

Like all radars, a phased array radar antenna does not transmit a single clean, monolithic radar lobe. Because of the constructive/destructive patterns, smaller lobes on either side of the main lobe exist. In many cases, the side lobes are undesirable and efforts are made to suppress their size and power because they are a source of ambiguity in regard to precisely locating a close-in radar contact. However, they will always exist.

Many parameters of an array affect its overall radiation pattern, including the number of elements, spacing between the elements and the digital weighting used to combine the energy from each of the individual elements. Any or all of these parameters could be employed to achieve the variation in main lobe power-to-side lobe power ratio.

The overall width of the main beam of an antenna array is most directly determined by its electrical size. The larger the antenna, the narrower the main beam. This electrical size can be varied by either physically varying the number of elements in the array and/or physically varying the spacing between elements.

The side lobe structure of an antenna is most directly determined by the number of elements that make up the array and their electrical spacing, so for a given element spacing, as the number of elements is changed, the number of side lobes will vary along with their positions. As the number of radiating/receiving elements decreases, the main lobe of the phased array radar gets wider and the number of side lobes decreases. For example, if there are only two radiating/receiving elements in a matrix, there will be two nulls in the beam pattern thus producing a main lobe and two side lobes. The fewer the number of radiating elements, the more pronounced the side lobes and the less pronounced is the main lobe.

Further, amplitude weighting used to combine the energy from each of the elements can also be used to vary the main beam to side lobe level ratio. A uniform element weighting will achieve the narrowest main beam. However, by reducing the weighting of the outer elements relative to the inner array elements, a higher peak side lobe-to-main lobe ratio will result along with a wider main beam.

FIGS. 1A-1C present explanatory diagrams (A-C) of arrangements of an exemplary 8×8 phased array matrix of elements 11. An 8×8 array 10 (See, FIG. 1A) will produce a relatively strong, narrow, well defined main lobe 100 with eight small side lobes 150 radiating alongside the main lobe in both elevation and in azimuth at progressively wider angles from the main lobe (See, FIGS. 2 and 3). In FIG. 1A, by ceasing radiation from all of the radiating elements 11 except for an 8×2 subset matrix 20, the main lobe 100' is weakened relative to is former condition 100 and more energy is radiated by side lobes 150' in the elevation or Y direction (See, FIG. 2). In FIG. 1B, by ceasing radiation from all of the radiating elements 11 except for an 2×8 subset matrix 30, the main lobe 100' is weakened relative to is former condition 100 and more energy is radiate in only two side lobes 150' in the azimuth or X direction (See FIG. 3). Similarly, in example C, ceasing radiation from all of the radiating elements 11 except for a 2×2 subset matrix 40, the main lobe 100' is weakened even further relative to its original condition 100 and more energy is radiated by the side lobes in both azimuth and elevation.

The matrix of elements can be altered by reconfiguring sub-arrays in the matrix. For example, in a reconfigurable sub-array approach, if the antenna matrix has 9×9 elements, the active matrix may be constructed with 3×3 sub-arrays. Alternatively, if digital beam forming is an option, a system designer may sum individual elements to construct the active matrix.

Other radar antenna types that may be adapted to automotive use include conventional parabolic dish antennas and digital beam forming antennas. Digital beam forming is the combination of radio signals from a set of small non-directional antennas to simulate a large directional antenna. The simulated antenna can be pointed electronically without using phase shifters. In beam forming, both the amplitude and phase of each antenna element are controlled. Combined amplitude and phase control can be used to adjust side lobe levels and steer nulls better than can be achieved by phase control alone.

An automobile is relatively small size, thus its proximity to the ground and its proximity to obstacles (such as other automobiles) often results in an automotive main lobe being blocked. However, it is difficult to electronically disambiguate a situation where the radar beam is blocked by an obstacle from one where there are no obstacles to be detected. Further, nearby adjacent vehicles may be detected by the side lobes 150, thereby causing a false indication that the vehicle is in the main lobe 100. Hence, it is desirable to minimize the bad effects of side lobes and to use the existence of side lobes to advantage where they do exist to improve the detection of obstacles by the automobile.

Furthermore, other desirable features and characteristics will become apparent from the subsequent detailed description and the appended claims, taken in conjunction with the accompanying drawings and the foregoing technical field and background.

SUMMARY

A method for disambiguating the location of a radar contact is provided. The method comprises transmitting a first radar energy pattern in a forward direction, collecting reflected energy of the first radar energy pattern from the contact, transmitting a second radar energy pattern in the forward direction and collecting reflected energy of the second radar energy pattern from the contact. The method further comprises comparing the collected energy of the first radar energy pattern and the collected energy of the second radar energy pattern and determining if the contact is located in a side lobe or a main lobe of the first and second radar energy pattern based on the comparison.

A method for operating a radar with a radar element array dimensioned N×M to disambiguate the location of a radar contact is provided. The method comprises enabling each radar element in the N×M element array, transmitting a first radar energy pattern in a specified direction using the N×M element array and collecting reflected energy of the first radar energy pattern from the contact. The method further comprises enabling only a portion of the N×M element array, transmitting a second radar energy pattern in the specified direction using only the portion of the N×M element array, collecting reflected energy of the second radar energy pattern from the contact. The method also comprises comparing the collected energy of the first radar energy pattern and the collected energy of the second radar energy pattern and determining if the contact is located in a side lobe or a main lobe of the first and second radar energy pattern based on the comparison.

A method for disambiguating the location of a radar contact is provided The method comprises transmitting a first radar energy pattern in a direction using an antenna with a first main lobe-to-side lobe power ratio, collecting reflected energy of the first radar energy pattern from the radar contact, and changing the electronic size of the antenna to produce a second main lobe-to-side lobe power ratio. The method further comprises transmitting a second radar energy pattern in the direction using the antenna with the second main lobe-to-side lobe power ratio, collecting reflected energy of the second radar energy pattern from the radar contact, and comparing the collected reflected energy of the first radar energy pattern and the collected energy of the second radar energy pattern. After the comparing it is determined if the radar contact is located in a side lobe or a main lobe of the first and second radar energy pattern based on the comparison.

DESCRIPTION OF THE DRAWINGS

The embodiments will hereinafter be described in conjunction with the following drawing figures, wherein like numerals denote like elements, and wherein.

DETAILED DESCRIPTION

Figure 1C:
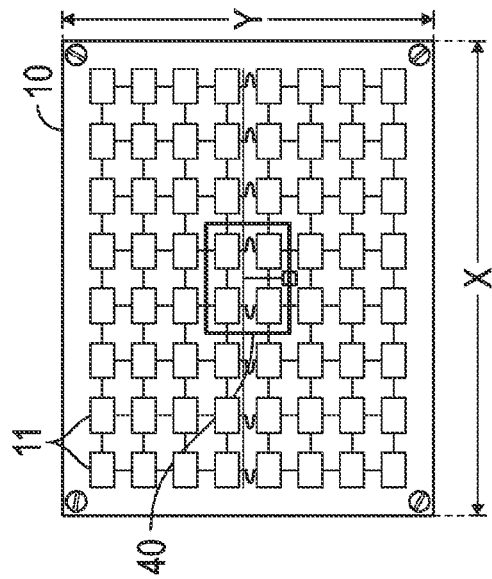
FIGS. 1A-1C include diagrams of exemplary matrix arrangements of an array antenna.

The following detailed description is merely exemplary in nature and is not intended to limit application and uses. Furthermore, there is no intention to be bound by any expressed or implied theory presented in the preceding technical field, background, brief summary or the following detailed description. Any diagrams of main and side lobe beams used herein are merely illustrative generalizations of relative intensity and location. No attempt has been made to correlate precise beam and side lobe count or shape to specific antenna size or shape. Such information is well known in the art and has been omitted for the sake of brevity and clarity.

Those of skill in the art will appreciate that the various illustrative logical blocks, modules, circuits, and algorithm steps described in connection with the embodiments disclosed herein may be implemented as electronic hardware, computer software executing on a processor, firmware, or combinations of each. Some of the embodiments and implementations are described herein in terms of functional and/or logical block components (or modules) and various processing steps. However, it should be appreciated that such block components (or modules) may be realized by any number of hardware, software executing on a processor, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "coupled to" used in describing a relationship between different elements do not imply that a direct physical connection must be made between these elements. For example, two elements may be coupled to each other physically, electronically, logically, or in any other manner, through one or more additional elements.

Different types of radar antennas may be conformed to automotive use and may be adapted to accomplish the novel features discussed herein below. Such antennas include parabolic dish antennas, analog and digital beam forming antennas and phased array antennas. Other existing antennas, and some that may be developed in the future, may also be useful in embodiments described below without departing from the spirit and scope of this disclosure. In the interest of brevity and clarity, only phased array radar antennas will be specifically discussed although Frequency Modulated Continuous Waveform (FMCW) radars are also suitable.

Figure 4:
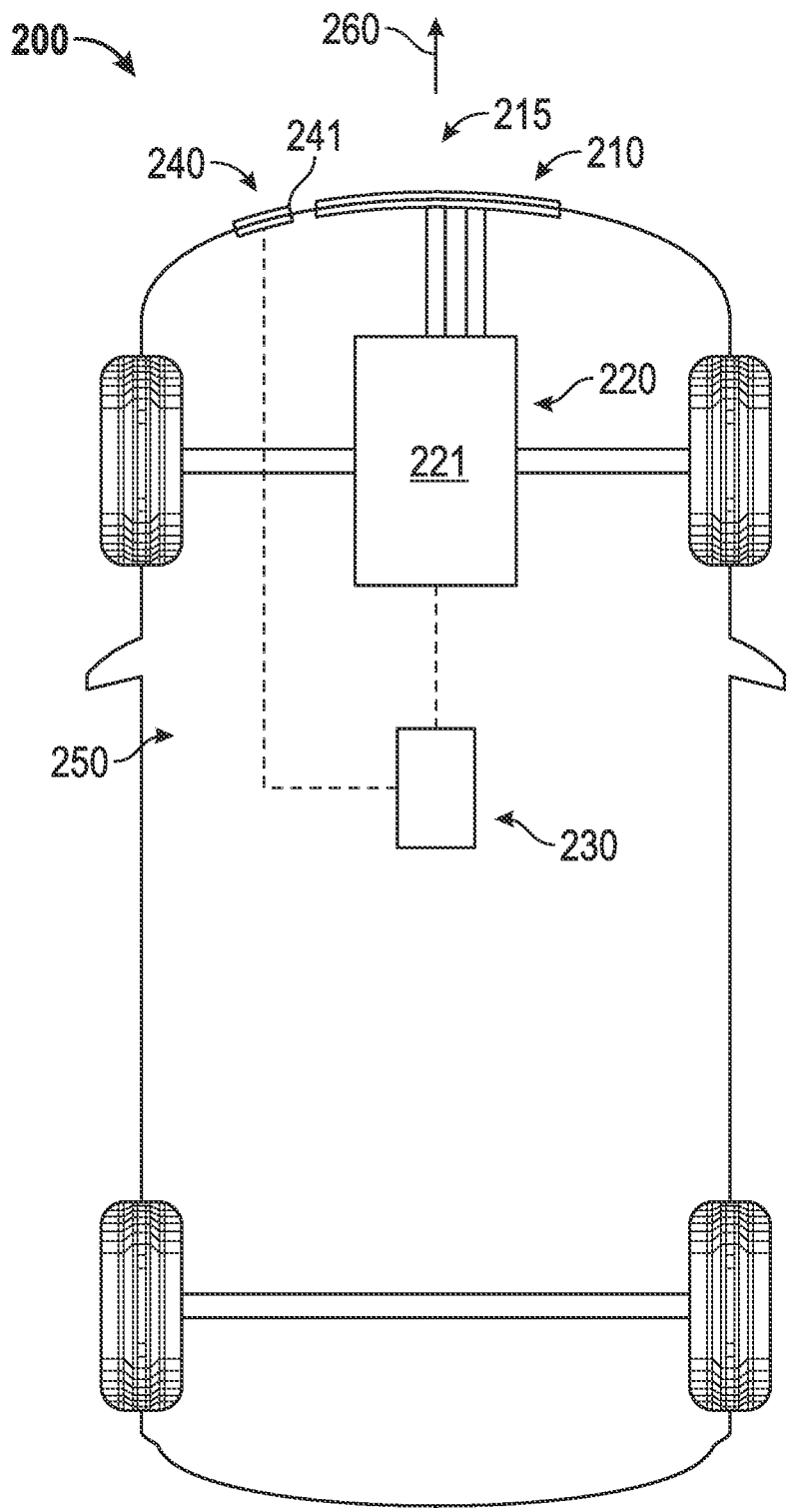
FIG. 4 is a simplified block diagram of a radar system in a vehicle.

Referring to FIG. 4, a vehicle is shown indicated generally at 200. The vehicle comprises a phased array radar antenna 210 further comprising a matrix of elements 215. Each element 215 is connected to a phase shifter 221 residing in a bank of phase shifters 220. Each phase shifter 221 controls the phase of at least one element 215. The phase shifters 221 and the elements 215 are controlled by radar controller 230. Specifically, the controller 230 is a computing device executing software that controls the transmission of a radar energy pattern and detects contacts from radar energy pattern returns from and controls which elements 215 radiate and the phase at which they radiate via the bank of phase shifters 220.

It will be understood by those of ordinary skill in the art that the elements 215 may be steerable radiating antenna elements, steerable receiving antenna elements or both depending on the equipment used and the design requirements for a particular purpose. If elements 215 are passive, steerable radar receiving elements, elements 215 detect radar energy return being reflected off a target that is transmitted by an active radar transmitter 240. Active radar transmitter 240 is also controlled by a controller, which may be controller 230 or another controller in operable communication with controller 230. If elements 215 are radiating elements, then elements 215 transmit the radar energy pattern the return from which is subsequently received by a receiver such as receiver 241. If elements 215 are transceiving elements, then elements 215 act as both transmitter and receiver antenna elements.

Figure 5:
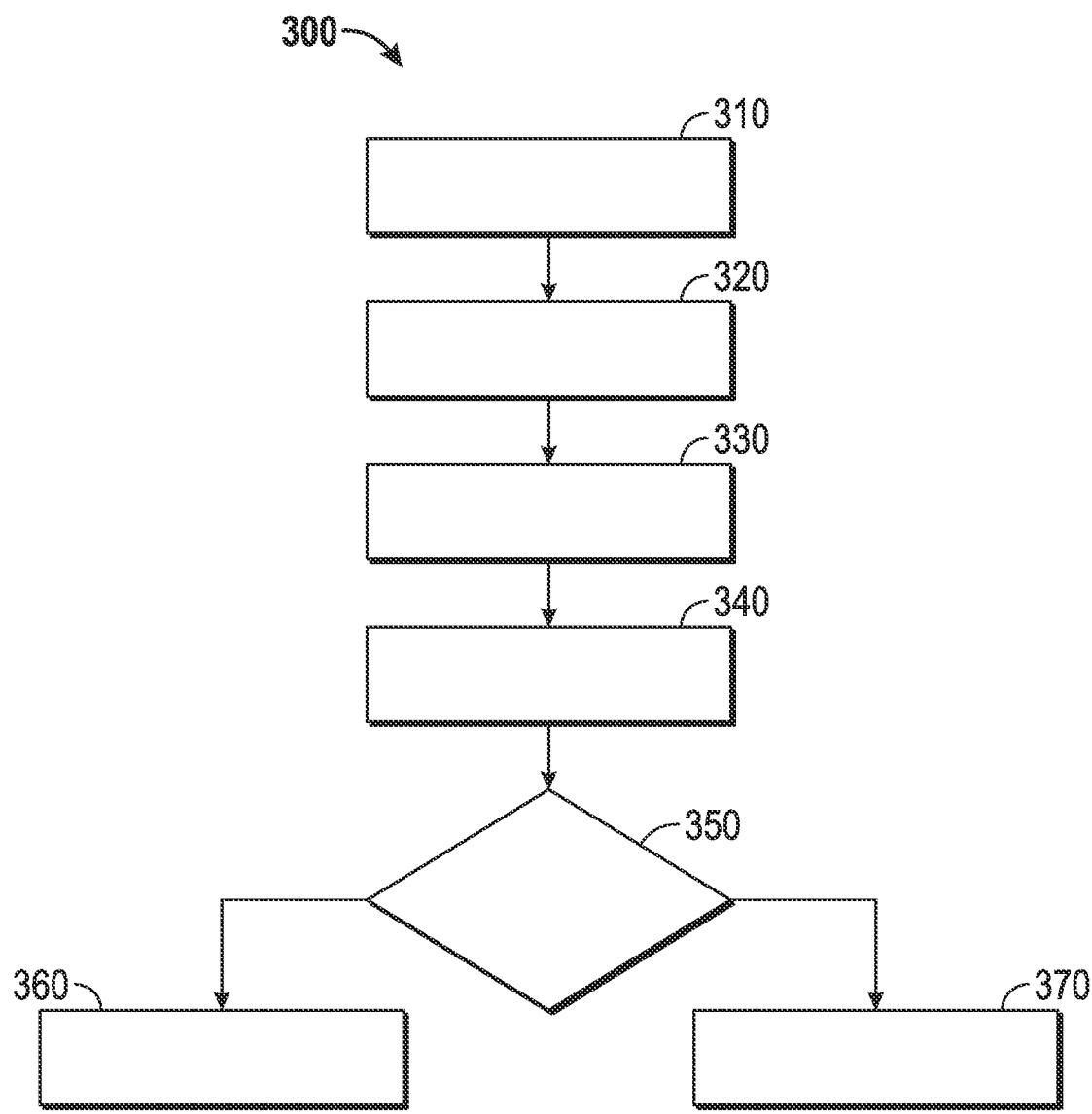
FIG. 5 is a simplified logic flow diagram of a method to disambiguate contacts located in a side lobe.

FIG. 5 is an exemplary method 300 for using a sequence of two or more energy reception patterns by a single phased array radar transceiver 250 (See FIG. 4). The two or more energy reception patterns being characterized as having ratios of main lobe energy-to-side lobe energy that are different. The actual means for transmitting the energy patterns is not particularly important in this example but may be assumed for the sale of discussion to be radar transmitter 240. The antenna transmitting the energy pattern may be a parabolic dish, a beam formed digitally or other type of antenna known in the art.

At process 310, a first energy pattern is transmitted by radar transmitter 240. In some embodiments, the direction of transmission of the main lobe is directly along the line of travel 260 of the vehicle 200, although the direction of transmission may be steered to one side or the other as may be accommodated by the particular make and model of radar transceiver being used. Such steering may be useful to transmit in the direction of a curve in the roadway, for example.

At process 320, any reflected energy from the first energy pattern ($RE_1$) by a contact is collected by a first subset of the elements 215 in the array antenna 210 having a first reception pattern (400/450) characterized by a first ratio of main lobe energy sensitivity relative to side lobe energy sensitivity. In this example, the first subset matrix is all of the elements 215, but in other embodiments the first subset may be fewer than all of the elements 215.

At process 330, a second energy pattern is transmitted by radar transmitter 240. In some embodiments the second energy pattern is equal in power, duration and frequency to the first energy pattern. However, in other embodiments the second energy pattern may different from the first energy pattern in power, duration and/or frequency by known amounts.

Figure 1B:
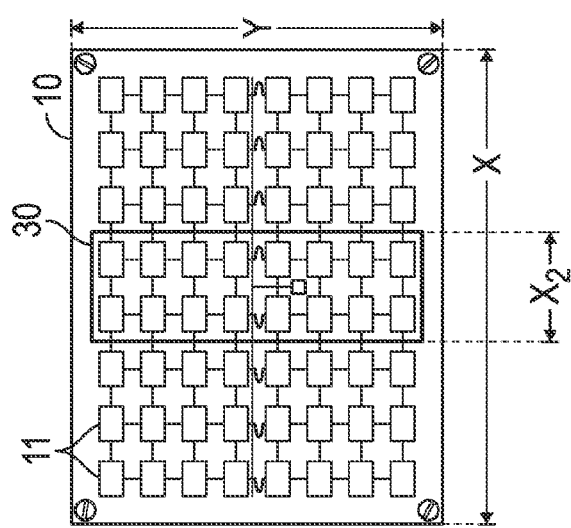
Figure 1A:
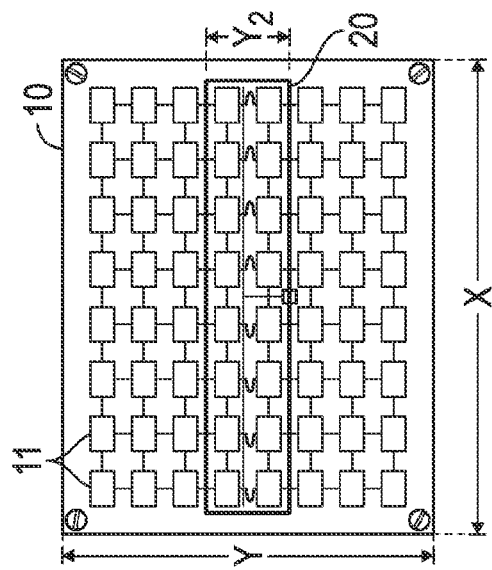
Figure 2:
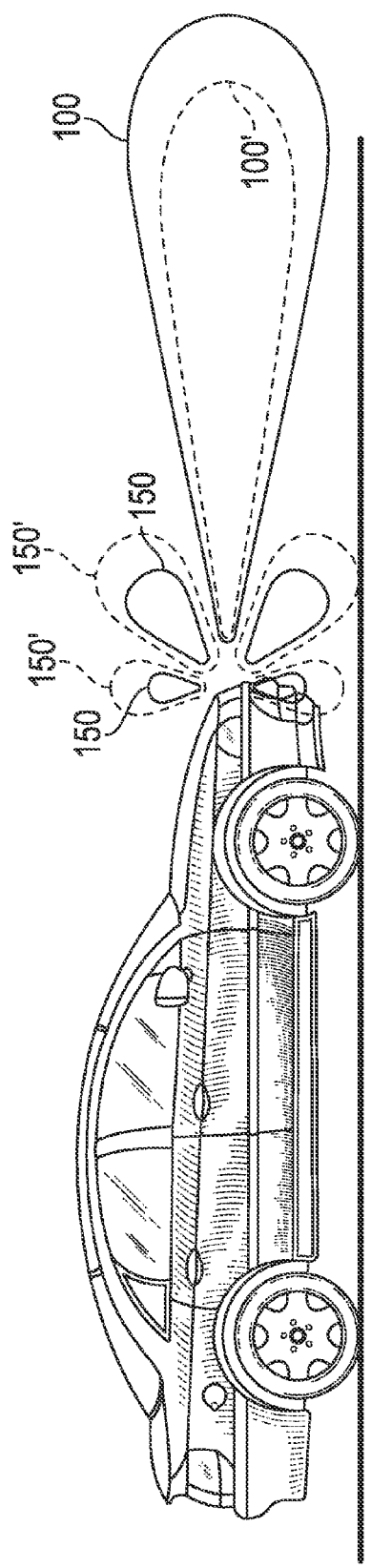
FIG. 2 is an exemplary radiation pattern produced by the exemplary matrix arrangements in FIG. 1A.
Figure 3:
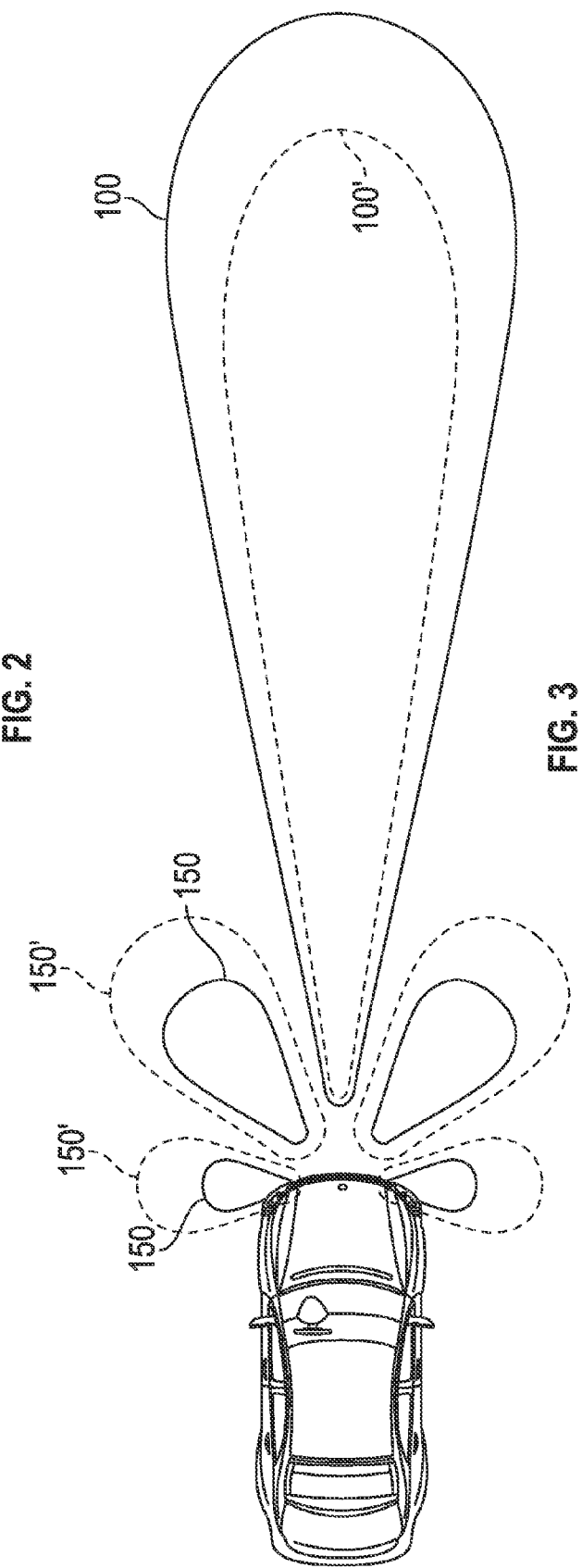
FIG. 3 is an exemplary radiation pattern produced by matrix arrangements in FIG. 1B.

At process 340, any reflected energy from the second energy pattern ($RE_2$) is collected by a smaller, second subset matrix of the elements 215 in the array antenna 210 having a second reception pattern (400'/450') characterized by a different ratio of main lobe energy sensitivity relative to side lobe energy sensitivity, where the width $X_2$ of the second subset matrix is less than the full width X of the array antenna 210 and the height Y of the second subset matrix is the same as the first In this example, the smaller second subset matrix may be exemplary subset matrix 30 (See, FIG. 1).

Figure 6:
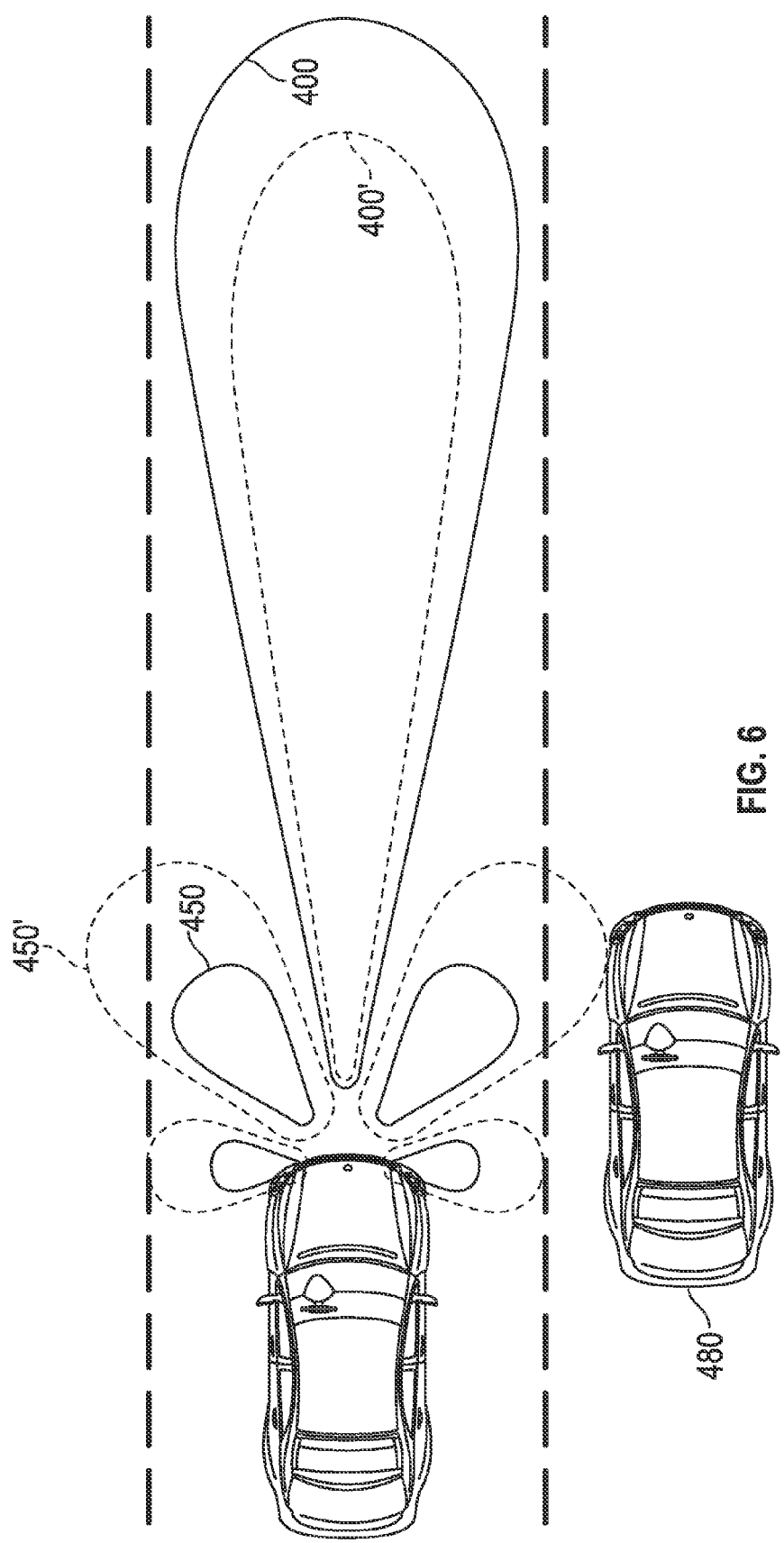
FIG. 6 is a situational illustration supporting the method of FIG. 5.

At process 350, the collected energy $RE_1$ is compared to the collected energy $RE_2$. If collected energy $RE_1$ is greater than collected energy $RE_2$ then the contact is determined to be located in the direction of the main lobe (400/400') at process 360. However, if collected energy $RE_1$ is less than collected energy $RE_2$ then the contact is determined to be located in one of the side lobes (450/450') at process 370. Thus, in this exemplary embodiment, radar energy patterns are transmitted and the directional sensitivity (i.e., the electronic size) of the element matrix 10 is altered to disambiguate the actual location of a contact. In FIG. 6, contact 480 is located in the area of the side lobes (450/450'), where $RE_1$ is less than $RE_2$.

As mentioned above, in other equivalent embodiments, method 300 may also be use where the array antenna 210 is the transmitting antenna and the receiver 241 is used to collect the reflected radar energy patterns. In these embodiments the first energy pattern is transmitted using the first subset matrix of the elements 215 and the second energy pattern is transmitted using a second subset matrix of the elements 215. The transmitted patterns being characterized in that the ratios of their main lobe power to their side lobe power being different. The collected radar energies (RE1 and RE2) are collected by the same receiver 241 and compared to disambiguate the location of a contact 480.

Figure 7:
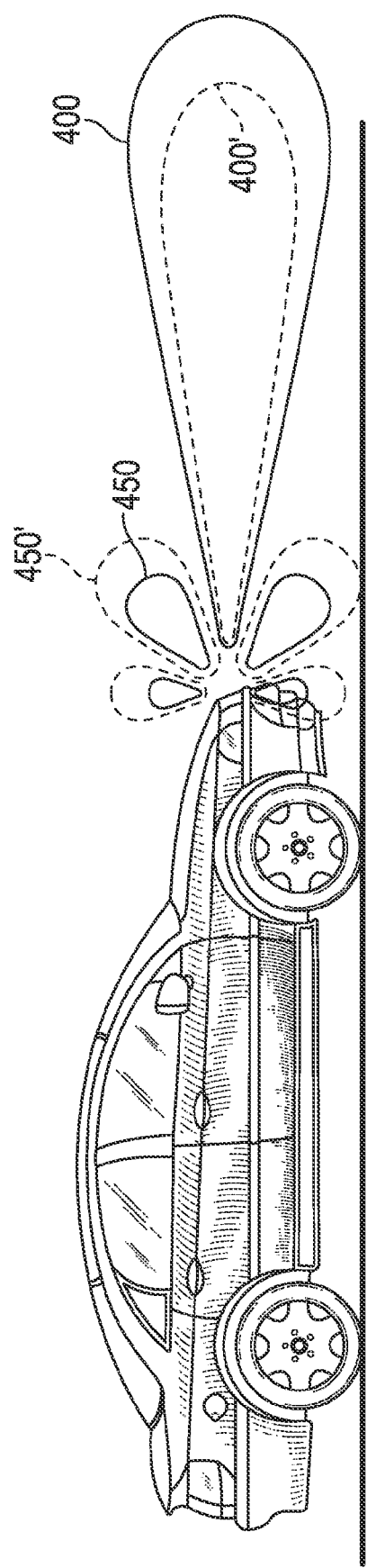
FIG. 7 is a situational illustration supporting the method of FIG. 8.
Figure 8:
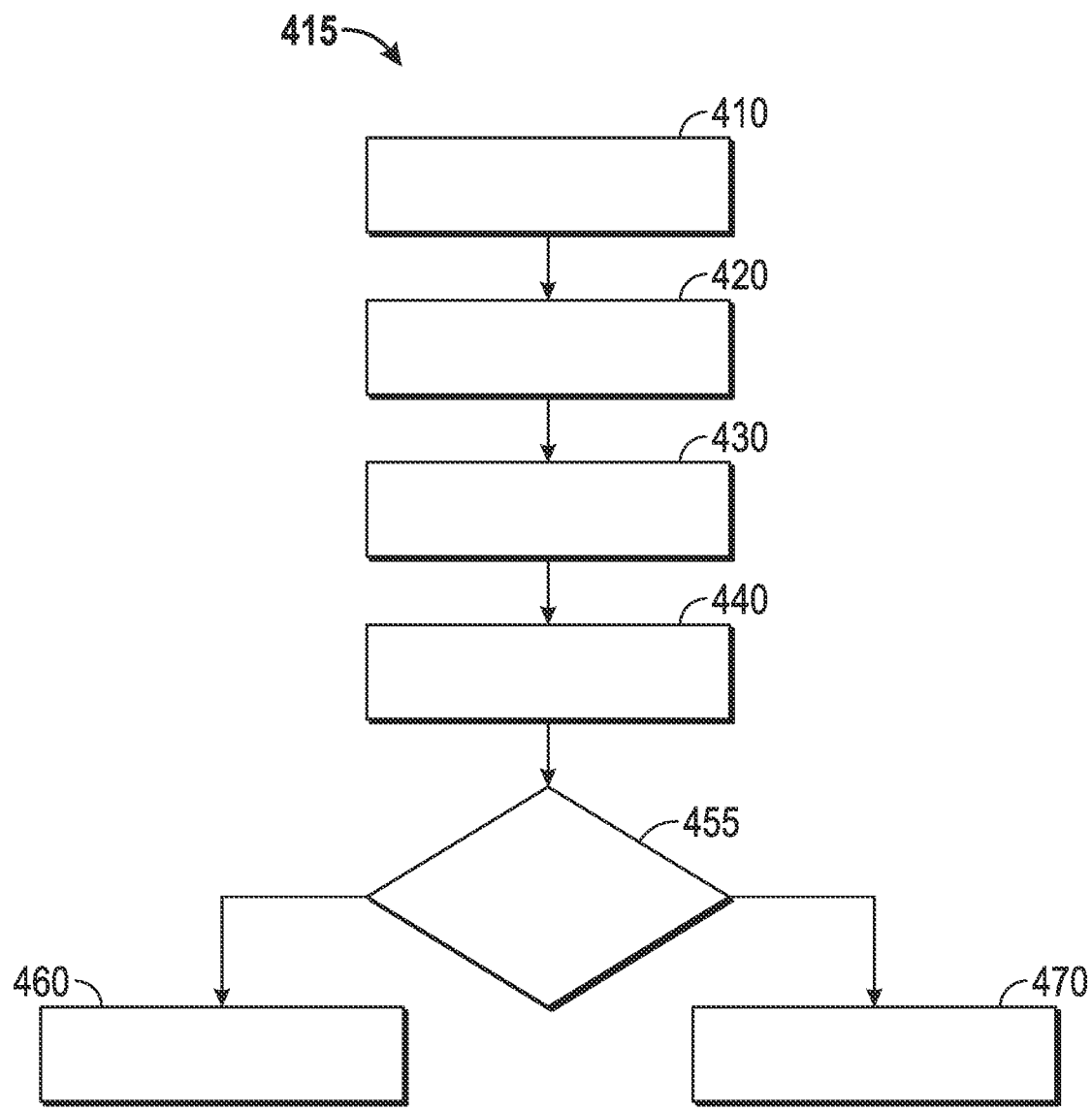
FIG. 8 is a simplified logic flow diagram of a method to determine if a radar antenna is blocked.

FIG. 8 is an exemplary method 415 for using a sequence of two or more transmitted energy patterns received by a single array radar transceiver 250 (See FIG. 4) to determine if the radar is blocked by an obstacle. The two or more transmitted energy patterns are characterized in that their ratios of main lobe energy to side lobe energy are different. The actual means for transmitting the energy patterns is not particularly important in this example but may be assumed for the sale of discussion to be radar transmitter 240. The transmitting antenna may be a parabolic antenna, a digitally formed antenna or other antenna known in the art, At process 410, a first energy pattern is transmitted by radar transmitter 240. In some embodiments, the direction of transmission of the main lobe is directly along the line of travel 260 of the vehicle 200, although the direction of transmission may be steered to one side or the other as may be accommodated by the particular make and model of radar transceiver being used. Such steering may be useful to transmit in the direction of a curve in the roadway, for example. At process 420, any reflected energy from the first energy pattern ($RE_1$) by a contact or the ground is collected by a first subset of the elements 215 in the array antenna 210 having a first reception pattern (400/450) (See, FIG. 7). In this example, the first subset matrix is all of the elements 215, but in other embodiments the first subset may be fewer than all of the elements 215.

At process 430, a second energy pattern is transmitted by radar transmitter 240. In some embodiments the second energy pattern is equal in power, duration and frequency to the first energy pattern. However, in other embodiments the second energy pattern may different from the first energy pattern in power, duration and/or frequency.

At process 440, any reflected energy from the second energy pattern ($RE_2$) is collected by a smaller, second subset matrix of the elements 215 in the array antenna 210 having a different reception pattern (400'/450') (See FIG. 7), where the height $Y_2$ of the second subset matrix is less than the full height Y of the array antenna 210 and the width X of the second subset matrix is the same as the first In this example, the smaller second subset matrix may be exemplary subset matrix 20 (See, FIG. 1).

At process 455, the collected energy $RE_1$ is compared to the collected energy $RE_2$. If collected energy $RE_2$ is greater than collected energy $RE_1$ and $RE_2$ is greater than a predefined threshold, then the array antenna 210 is not blocked by an obstacle. However, if collected energy $RE_1$ is greater or equal to the collected energy $RE_2$ and $RE_2$ is smaller than a predefined threshold then the radar antenna cannot see the ground and is therefore blocked by an obstacle. Thus in this exemplary embodiment, radar energy patterns are transmitted and the directional sensitivity of the element matrix 20 is altered to determine if the radar antenna 210 is blocked by an obstacle.

As mentioned above, in other equivalent embodiments, process 415 may also be use where the array antenna 210 is the transmitting antenna and the receiver 241 is used to collect the reflected radar energy patterns. In these embodiments the first energy pattern is transmitted using the first subset matrix of the elements 215 and the second energy pattern is transmitted using a second subset matrix of the elements 215. The collected radar energies (RE1 and RE2) are collected by the same receiver 241 and compared to themselves and to predetermined thresholds to determine if the radar antenna 210 is blocked by an obstacle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for disambiguating a location of a radar contact comprising:
   transmitting a first radar energy pattern in a specified direction;
   collecting reflected energy of the first radar energy pattern from the radar contact;
   transmitting a second radar energy pattern in the specified direction;
   collecting reflected energy of the second radar energy pattern from the radar contact;
   comparing the collected reflected energy of the first radar energy pattern and the collected reflected energy of the second radar energy pattern; and
   determining if the radar contact is located in a side lobe or the main lobe of the first and second radar energy pattern based on the comparison;
   wherein a first matrix of antenna elements is used to transmit the first radar energy pattern and a second matrix of antenna elements is used to transmit the second radar energy pattern, the first matrix is of a different size that the second matrix; and
   wherein the first matrix is determined not to be blocked when the collected reflected energy of the second radar energy pattern is greater than the collected reflected energy of the first radar energy pattern and the collected reflected energy of the second radar energy pattern is greater than a predetermined threshold.

2. The method of claim 1, wherein the first matrix of antenna elements is used to collect the reflected energy of the first radar energy pattern, and the second matrix of antenna elements is used to collect the reflected energy of the second radar energy pattern.

3. The method of claim 2, wherein a horizontal dimension of the first matrix is larger than a horizontal dimension of the second matrix.

4. The method of claim 3, wherein the radar contact is determined to be located in the main lobe when the collected reflected energy of the first radar energy pattern is greater than the collected reflected energy of the second radar energy pattern.

5. The method of claim 3, wherein the radar contact is determined to be located in the side lobe when the collected reflected energy of the first radar energy pattern is less than the collected reflected energy of the second radar energy pattern.

6. The method of claim 1, wherein a horizontal size of the first matrix is larger than the horizontal size of the second matrix.

7. The method of claim 6, wherein the radar contact is determined to be located in the main lobe when the collected reflected energy of the first radar energy pattern is greater than the collected reflected energy of the second radar energy pattern.

8. The method of claim 6, wherein the radar contact is determined to be located in a side lobe when the collected reflected energy of the first radar energy pattern is less than the collected reflected energy of the second radar energy pattern.

9. The method of claim 2, wherein a vertical dimension of the first matrix is larger than a vertical size of the second matrix.

10. The method of claim 1, wherein the first matrix is determined to be blocked when the collected reflected energy of the second radar energy pattern is not greater than the collected reflected energy of the first radar energy pattern and the collected reflected energy of the second radar energy pattern is less than a predetermined threshold.

11. A method for operating a N×M dimensioned radar element array to disambiguate a location of a radar contact comprising:
enabling each radar element in the N×M element array;
transmitting a first radar energy pattern in a direction using the N×M element array;
collecting reflected energy of the first radar energy pattern from the radar contact;
enabling only a portion of the N×M element array;
transmitting a second radar energy pattern in the direction using only the portion of the N×M element array;
collecting reflected energy of the second radar energy pattern from the radar contact;
comparing the collected reflected energy of the first radar energy pattern and the collected reflected energy of the second radar energy pattern; and
determining if the radar contact is located in a side lobe or a main lobe of the first and second radar energy pattern based on the comparison;
wherein the N×M element array is determined to be blocked when the collected reflected energy of the second radar energy pattern is not greater than the collected reflected energy of the first radar energy pattern and the collected reflected energy of the second radar energy pattern is less than a predetermine threshold.

12. The method of claim 11, wherein the radar contact is determined to be located in the main lobe when the collected reflected energy of the first radar energy pattern is greater than the collected reflected energy of the second radar energy pattern.

13. A method for disambiguating a location of a radar contact comprising:
transmitting a first radar energy pattern in a specified direction;
collecting reflected energy of the first radar energy pattern from the radar contact;
transmitting a second radar energy pattern in the specified direction;
collecting reflected energy of the second radar energy pattern from the radar contact;
comparing the collected reflected energy of the first radar energy pattern and the collected reflected energy of the second radar energy pattern; and
determining if the radar contact is located in a side lobe or the main lobe of the first and second radar energy pattern based on the comparison;
wherein a first matrix of antenna elements is used to collect the reflected energy of the first radar energy pattern, and a second matrix of antenna elements is used to collect the reflected energy of the second radar energy pattern, and the first matrix is of a different size than the second matrix; and
wherein the first matrix is determined to be blocked when the collected reflected energy of the second radar energy pattern is not greater than the collected reflected energy of the first radar energy pattern and the collected reflected energy of the second radar energy pattern is less than a predetermined threshold.

14. The method of claim 13, wherein a horizontal dimension of the first matrix is larger than a horizontal dimension of the second matrix.

15. The method of claim 13, wherein the radar contact is determined to be located in the main lobe when the collected reflected energy of the first radar energy pattern is greater than the collected reflected energy of the second radar energy pattern.

16. The method of claim 13, wherein the radar contact is determined to be located in the side lobe when the collected reflected energy of the first radar energy pattern is less than the collected reflected energy of the second radar energy pattern.

17. The method of claim 13, wherein the first matrix of antenna elements is used to transmit the first radar energy pattern and the second matrix of antenna elements is used to transmit the second radar energy pattern.

18. The method of claim 13, wherein a vertical dimension of the first matrix is larger than a vertical size of the second matrix.

19. The method of claim 13, wherein the first matrix is determined not to be blocked when the collected reflected energy of the second radar energy pattern is greater than the collected reflected energy of the first radar energy pattern and the collected reflected energy of the second radar energy pattern is greater than a predetermined threshold.

\* \* \* \* \*